Figure 1:
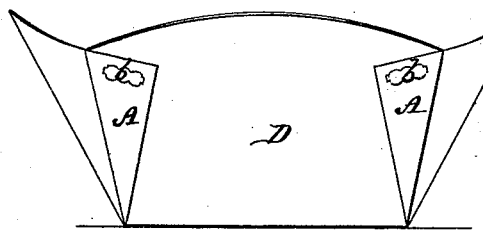

D. N. RUSSELL.
PAPER DISH.

No. 177,356. Patented May 16, 1876.

Witnesses:
E. Wolff.
Jacob Felbel

Inventor:
Daniel N. Russell
By Attorney.
J. N. McIntire

N. PETERS, PHOTO-LITHOGRAPHER, WASHINGTON, D. C.

UNITED STATES PATENT OFFICE.

DANIEL N. RUSSELL, OF NEW YORK, N. Y.

IMPROVEMENT IN PAPER DISHES.

Specification forming part of Letters Patent No. 177,356, dated May 16, 1876; application filed April 6, 1876.

*To all whom it may concern:*

Be it known that I, DANIEL N. RUSSELL, of New York city, in the county of New York, in the State of New York, have invented a new Receptacle for Holding Butter, Lard, &c.; and I do hereby declare that the following is a full and exact description thereof, reference being had to the accompanying drawings, and to the letters of reference marked thereon.

Previous to my invention great loss and inconvenience have been experienced by retail grocers in the sale of butter and lard for the want of some proper and cheap receptacle or package in which to put up such articles to send out to customers. This difficulty has been in a great measure overcome by the introduction into use extensively of a "grocer's butter-dish," composed of paper, and having its interior coated with a grease and waterproof preparation, and made the subject of Letters Patent granted to me on the 4th of May, 1875, numbered 162,954, in which patent will be found fully described the general advantages of such a dish over the crocks and tins previously employed. But a great want of the trade is still felt in the need of some cheaper receptacle, which will at the same time be perfectly efficient for the purpose of putting up, in small quantities, butter and lard. I have by my present invention produced an article eminently adapted to supply this want.

My invention has for its main object to supply for the use of the grocer a very light, cheap, and sufficiently strong and durable dish or receptacle, into which the butter or lard may be put to be sent out to, or carried off by, the customer without risk of either the contents of the dish being made to smell or taste of the material of the latter, or of its penetrating the latter, so as to grease anything with which the dish may come in contact.

To these ends and objects my invention consists in a dish or receptacle composed of a single piece of paper, or other suitably cheap, light, and strong material, without any severance of the stock, and coated on the interior with some suitable preparation by which the stock is rendered impervious to grease, and which will not impart any odor or taste to the contents of the dish, all as hereinafter more fully described. And my invention also consists in a novel shape or form of dish to adapt it to the reception and retention of butter in the form in which the latter is generally cut out of the firkins for retail by the grocer.

To enable those skilled in the art to make and use my invention, I will proceed to more fully explain it, referring by letters to the accompanying drawings, in which—

Figure 2:
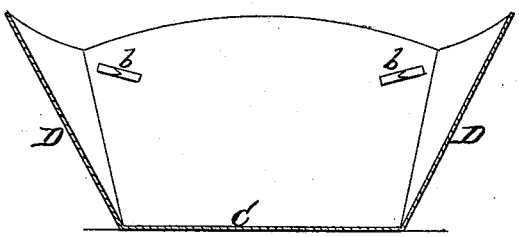
Figure 3:
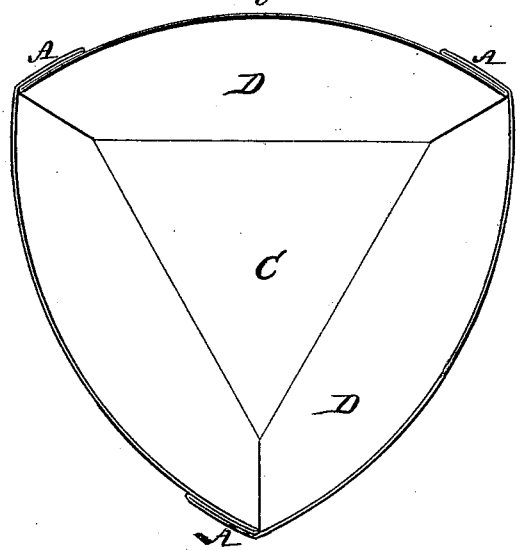
Figure 4:
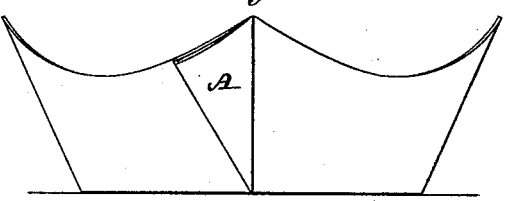
Figure 6:
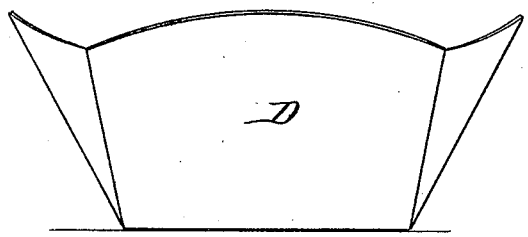
Figure 5:
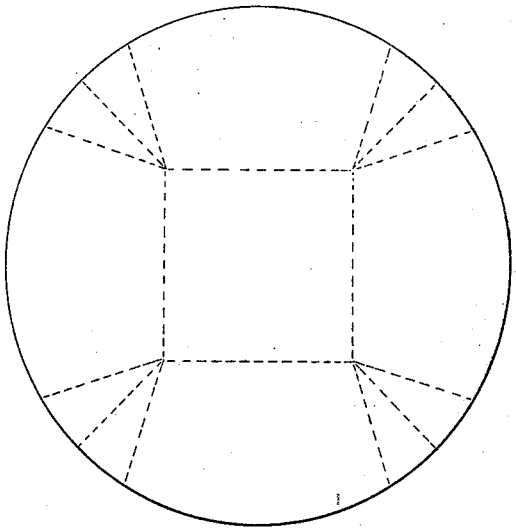

Figure 1 is a side view, and Fig. 2 a vertical central section, of a paper butter-dish made according to my invention. Fig. 3 is a top view, and Fig. 4 is a side view, of a dish of the peculiar form made the subject of the second part of my invention. Fig. 5 is a plan of the blank from which a dish, such as seen at Figs. 1 and 2, is made, and Fig. 6 is a side view of a dish like that seen at Figs. 1 and 2, except that in folding up the corners the fold is made on the inside instead of the outside of the dish.

In the several figures the same part will be found designated by the same letter of reference.

The dish seen at Figs. 1 and 2 is made from a single and uncut piece or blank of Manila paper of the shape seen at Fig. 5. This circular blank is scored or creased, as illustrated by the dotted lines in Fig. 5, and the stock is then bent or folded up in these lines to assume the shape seen at Figs. 1 and 2, and the folded-up portions A are fastened and held in position either by metalic clasps *b*, as shown, or by gluing or otherwise securing together the folds of the stock. Thus is produced the bottom C and body or sides D of the receptacle out of a single piece of stock, and without any severance or cutting of the latter, the result being a dish or receptacle without any seam or joint through which any leakage might occur. The dish seen at Figs. 3 and 4 is made in the same manner, except that it is folded up or formed out of a blank of such different shape as to render the dish triangular in its plan, as shown. The great object and advantage of this triangular shape are that it will most conveniently receive and hold the pieces of butter, (of one and two pounds, &c.,) as they are generally cut by grocers in retailing firkin butter.

As is well known, the grocer usually cuts the butter into layers, (in the circular tub,) and then, in retailing out to customers, cuts these layers into sector-like pieces. I propose to have the triangular dishes (like others) made of different sizes, for one-pound, two-pound packages, &c., and the triangular contour will, of course, be made about equal in dimensions to the size and shape of pieces usually cut from the tubs or firkins. The interior of the dish, or that side of the stock of the blank that comes inside, is coated over or prepared in such a manner as to be grease-proof, and that at the same time so that it cannot impart to the contents of the dish the slightest odor or taste, even if butter be left in it for several days.

In the present manufacture of my improved dishes I coat one side of the paper blanks with a simple preparation of clarified shellac dissolved in alcohol and applied with a brush, and this coating I have found to answer admirably the desired purposes. I have been unable to detect the slightest odor or taste in butter left standing for several days in a dish so coated, and have found that a piece of silk rubbed on the outside of such a dish, with lard contained for some time in it, (in a soft condition,) would not be soiled in the least. But other coatings may be employed, or the surface of the paper may be otherwise prepared, if deemed expedient. I have found a simple mixture of equal parts of beef suet and bees-wax, separately melted, and then boiled together and applied with a brush, to answer well for a coating; and a preparation such as described by me in my patent of May 4, 1875, has given perfect satisfaction.

If the stock be folded up so as to bring the folds at the corners of the dish inside, as shown at Fig. 6, the external appearance of the dish will be neater; but I prefer to have the folds outside, so as to have as few projections as possible inside, as I have found by experience that if the folds be made on the inside the lard or butter will not turn or dump out so readily, but will stick or clog.

It will be seen that a dish formed out of a solid blank or piece, as shown and described, without seams, will afford no opportunity for leakage; can be readily made, cheaply and rapidly, (and by machinery,) and will possess great proportionate strength; it will be so light as not to perceptibly detract from the weight of the contents; and that therefore the grocer can just slap the butter or lard into the dish on the scales, and not have to stop to weigh dish and contents separately. And it will be understood that in carrying out my invention other materials than the paper alluded to may be used, and that one or more of the features of my invention may be used without using all.

The dishes are made so as to pack together, or "nest," so as to be conveniently shipped or put up for the market.

I have designed and so far used my improved dish for a grocer's butter and lard receptacle, but it will be seen that if made of proper size, and if expedient, perforated for ventilation, it may be manufactured and used for berries or fruit.

Having so fully explained my invention that a skilled person can make and use it, what I claim as new, and desire to secure by Letters Patent, is—

1. A dish or receptacle composed of a single piece or blank of material, uncut, folded up into substantially the shape set forth, and having its interior coated with a grease-proof preparation, all substantially as and for the purposes described.

2. A dish composed of fibrous material, and triangular in shape or contour, as described, for the purpose set forth.

In testimony whereof I have hereunto set my hand and seal this 3d day of April, 1876.

DANL. N. RUSSELL. [L. S.]

Witnesses:
 WM. BRUORTON,
 JACOB FELBEL.